United States Patent
Lee et al.

(10) Patent No.: US 11,683,760 B2
(45) Date of Patent: Jun. 20, 2023

(54) UE ASSISTANCE INFORMATION (UAI) OF BATTERY POWER SAVING

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Brian Clarke Banister, San Diego, CA (US); Daniel Amerga, San Diego, CA (US); Karthik Venkatram, San Diego, CA (US); Peter Pui Lok Ang, San Diego, CA (US); Jafar Mohseni, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 67 days.

(21) Appl. No.: 17/316,023

(22) Filed: May 10, 2021

(65) Prior Publication Data

US 2022/0361110 A1 Nov. 10, 2022

(51) Int. Cl.
*H04W 52/02* (2009.01)
*H04B 7/0413* (2017.01)

(52) U.S. Cl.
CPC ...... *H04W 52/0261* (2013.01); *H04B 7/0413* (2013.01)

(58) Field of Classification Search
CPC .......... H04W 52/0261; H04B 7/0413
See application file for complete search history.

(56) References Cited

U.S. PATENT DOCUMENTS

| 2013/0225145 | A1* | 8/2013 | Cherian | ............ | H04W 52/0261 |
|---|---|---|---|---|---|
| | | | | | 455/418 |
| 2020/0106674 | A1* | 4/2020 | Van Der Velde | ..... | H04W 24/02 |
| 2022/0150829 | A1* | 5/2022 | Yoon | ................. | H04W 52/0225 |

FOREIGN PATENT DOCUMENTS

| EP | 3893559 A1 | 10/2021 |
|---|---|---|
| WO | 2020145622 A1 | 7/2020 |

OTHER PUBLICATIONS

International Search Report and Written Opinion—PCT/US2022/023092'ISA/EPO—dated Jul. 19, 2022.
(Continued)

*Primary Examiner* — Yuwen Pan
*Assistant Examiner* — Angelica Perez
(74) *Attorney, Agent, or Firm* — Patterson + Sheridan, L.L.P.

(57) ABSTRACT

Certain aspects of the present disclosure provide techniques for detecting power consumption conditions to trigger transmission of user equipment (UE) assistance information (UAI) for a reconfiguration request. For example, an example method by a UE generally includes detecting one or more conditions associated with at least one metric related to UE power consumption; and transmitting UAI to a network entity, in response to the detection, to request a reconfiguration of the UE to operate according to a set of one or more parameters selected based on a value of the at least one metric.

26 Claims, 17 Drawing Sheets

(56) References Cited

OTHER PUBLICATIONS

Samsung: "On UE Assistance Information", 3GPP Draft, 3GPP TSG RAN WG1 RAN1 Meeting #98bis, R1-1910500, On UE Assistance Information, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 4, 2019 (Oct. 4, 2019), XP051789305, 3 Pages, Retrieved from the Internet: URL: http://www.3gpp.org/ftp/tsg_ran/WG1_RL1/TSGR1_98b/Docs/R1-1910500.zip [Retrieved on Oct. 4, 2019] paragraphs [02.1]-[02.2].

\* cited by examiner

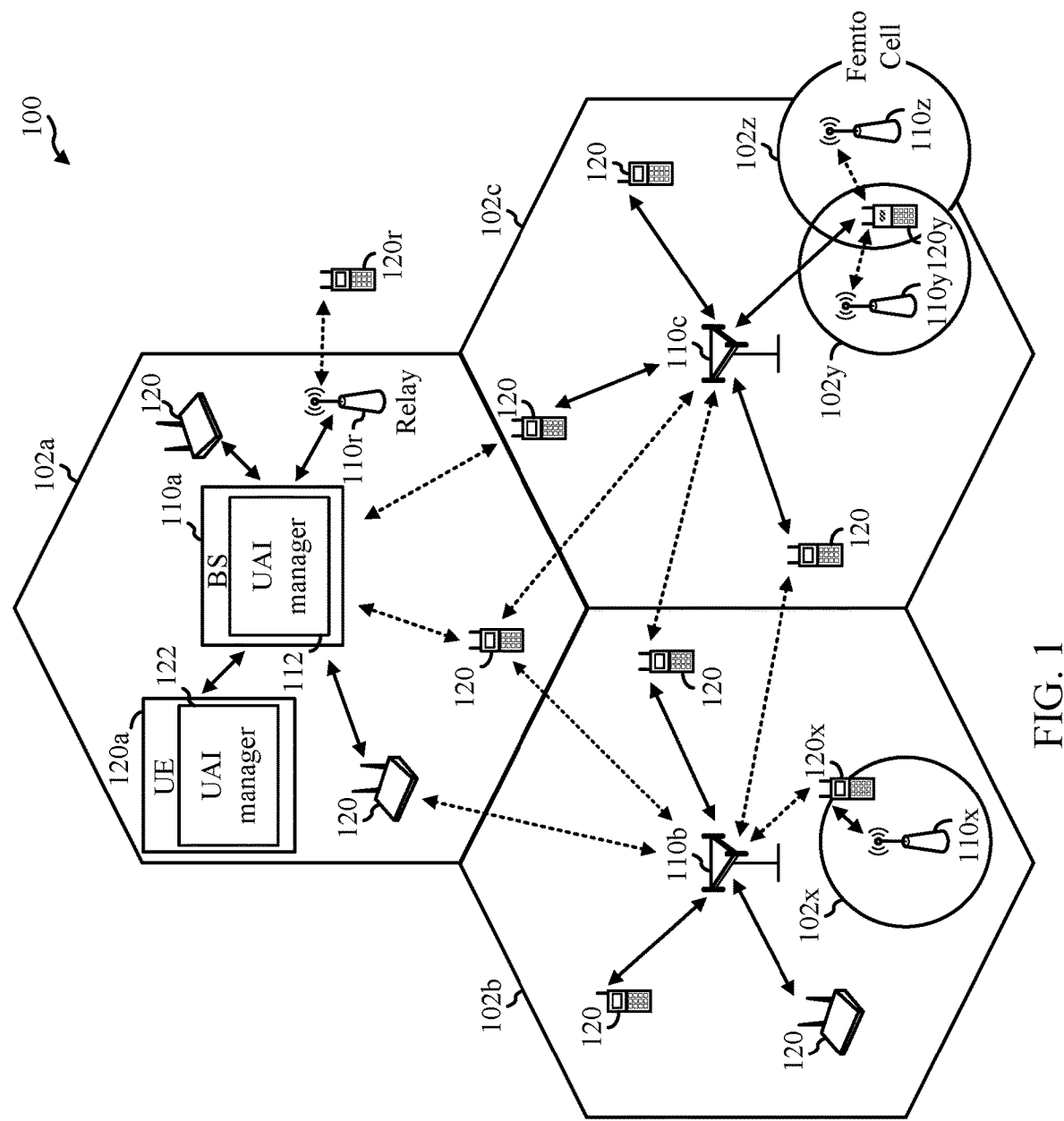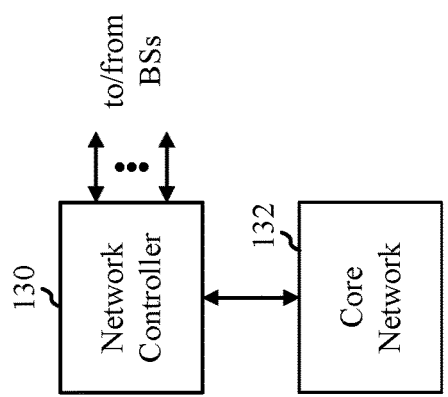
FIG. 1

```
UEAssistanceInformation-v16xy-IEs ::= SEQUENCE {
....
  maxBW-Preference-r16           MaxBW-Preference-r16        OPTIONAL,
  maxCC-Preference-r16           MaxCC-Preference-r16        OPTIONAL,
  maxMIMO-LayerPreference-r16    MaxMIMO-LayerPreference-r16 OPTIONAL,
...
}

MaxBW-Preference-r16 ::=    SEQUENCE {
  reducedMaxBW-FR1-r16        SEQUENCE {
    reducedBW-FR1-DL-r16         ReducedAggregatedBandwidth,
    reducedBW-FR1-UL-r16         ReducedAggregatedBandwidth  } OPTIONAL,
  reducedMaxBW-FR2-r16        SEQUENCE {
    reducedBW-FR2-DL-r16         ReducedAggregatedBandwidth,
    reducedBW-FR2-UL-r16         ReducedAggregatedBandwidth  } OPTIONAL
}

MaxCC-Preference-r16 ::=    SEQUENCE {
  reducedCCsDL-r16           INTEGER (0..31) OPTIONAL,
  reducedCCsUL-r16           INTEGER (0..31) OPTIONAL
}

MaxMIMO-LayerPreference-r16 ::=   SEQUENCE {
  reducedMaxMIMO-LayersFR1-r16     SEQUENCE {
    reducedMIMO-LayersFR1-DL-r16     INTEGER (1..8),
    reducedMIMO-LayersFR1-UL-r16     INTEGER (1..4)
  } OPTIONAL,
  reducedMaxMIMO-LayersFR2-r16     SEQUENCE {
    reducedMIMO-LayersFR2-DL-r16     INTEGER (1..8),
    reducedMIMO-LayersFR2-UL-r16     INTEGER (1..4)
  } OPTIONAL
}
```

FIG. 7

| Cases | Conditions: | UE procedure |
|---|---|---|
| Aggressive mitigation | Battery level, B<br><br>B < TH1 (e.g. 15%)<br>AND<br>Not connected to AC adaptor | Send UAI to reduce according to NV configuration:<br>• ReducedCCs = NV_ReducedCCs<br>• ReducedMaxBW = NV_ReducedMaxBW<br>• ReducedMIMO-Layers-DL= 2<br>• ReducedMIMO-Layers-UL= 1 |
| Moderate mitigation | TH1 ≤ B < TH2 (e.g. 30%)<br>AND<br>Not connected to AC adaptor<br>AND<br>APP not indicating performance issue, e.g. no data stall, long latency<br><br>If TH2 = TH1, then this case is not used | Send UAI to SCG with ReducedCCs = 0 (Release SCG).<br><br>Send UAI for MCG with ReducedCCs, ReducedMIMO-Layers-DL, ReducedMIMO-Layers-UL, depending on measurement metrics (see next slides) |
| No mitigation | TH2 ≤ B | Send UAI to recover:<br>• ReducedCCs = empty<br>• ReducedMaxBW = empty<br>• ReducedMIMO-Layers-DL= empty<br>• ReducedMIMO-Layers-UL= empty |

FIG. 11

| Battery level | DL Throughput, D | SCell Utilization, U(j) | 4Rx Percentage Time, R | Action |
|---|---|---|---|---|
| Between TH1 and TH2 | N/A | LOW | N/A | UAI for reduce CCs = X (depending metrics of SCell) |
| | LOW | N/A | HIGH | UAI for reduce DL MIMO layers = 2 |
| | Otherwise | | | N/A (if reduced, then restore) |

FIG. 12

| Battery level | Modem NOT in Low Latency Mode, e.g. no active URLLC service | UL PDCP WM, W | UL throughput, U | Action |
|---|---|---|---|---|
| Between TH1 and TH2 | YES | LOW | LOW | UAI for reduce UL MIMO layer = 1 |
| | Otherwise | | | N/A (if reduced, then restore) |

FIG. 13

| Cases | Conditions: | UE procedure |
|---|---|---|
| Aggressive mitigation | Battery level, B<br><br>B < TH1 (e.g. 15%)<br>AND<br>Not connected to AC adaptor | UE sends UAI to SCG with ReducedCCs = 0 (Release SCG). |
| Moderate mitigation | TH1 ≤ B < TH2 (e.g. 30%)<br>AND<br>Not connected to AC adaptor<br>AND<br>APP not indicating performance issue, e.g. no data stall, long latency<br><br>If TH2 = TH1, then this case is not used | UE sends UAI to SCG with ReducedCCs = NV |
| No mitigation | TH2 ≤ B | Send UAI to recover SCG:<br>• ReducedCCs = empty |

| NV Parameter | Range in 3GPP spec | Default |
|---|---|---|
| reducedBW-FR1-DL_NV | 0, 10, 20, 30, 40, 50, 60, 80, 100, 200, 300, 400 (MHz) | 20 (MHz) |
| reducedBW-FR1-UL_NV | 0, 10, 20, 30, 40, 50, 60, 80, 100, 200, 300, 400 (MHz) | 20 (MHz) |
| reducedBW-FR2-DL_NV | 0, 10, 20, 30, 40, 50, 60, 80, 100, 200, 300, 400 (MHz) | 20 (MHz) |
| reducedBW-FR2-UL_NV | 0, 10, 20, 30, 40, 50, 60, 80, 100, 200, 300, 400 (MHz) | 20 (MHz) |
| reducedCCsDL_NV | 0..31 | 0 |
| reducedCCsUL_NV | 0..31 | 0 |

1600B

| NV Parameter | Range in 3GPP spec | Default |
|---|---|---|
| reducedCCsDL_NV | 0..31 | 1 |
| reducedCCsUL_NV | 0..31 | 1 |

FIG. 16

UE ASSISTANCE INFORMATION (UAI) OF BATTERY POWER SAVING

BACKGROUND

Field of the Disclosure

Aspects of the present disclosure relate to wireless communications, and more particularly, to techniques for detecting power consumption conditions to trigger transmission of user equipment (UE) assistance information (UAI) for a reconfiguration request.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for a user equipment (UE) to detect power consumption conditions to trigger transmission of UE assistance information (UAI) for a reconfiguration request.

Certain aspects provide a method of wireless communications by a UE. The method generally includes detecting one or more conditions associated with at least one metric related to UE power consumption; and transmitting UAI to a network entity, in response to the detection, to request a reconfiguration of the UE to operate according to a set of one or more parameters selected based on a value of the at least one metric.

Certain aspects provide an apparatus for wireless communications by a UE. The apparatus generally includes at least one processor and a memory configured to detect one or more conditions associated with at least one metric related to UE power consumption; and transmit UAI to a network entity, in response to the detection, to request a reconfiguration of the UE to operate according to a set of one or more parameters selected based on a value of the at least one metric.

Certain aspects provide an apparatus for wireless communications. The apparatus generally includes means for detecting one or more conditions associated with at least one metric related to UE power consumption; and means for transmitting UAI to a network entity, in response to the detection, to request a reconfiguration of the UE to operate according to a set of one or more parameters selected based on a value of the at least one metric.

Certain aspects of the subject matter described in this disclosure can be implemented in a computer readable medium storing computer executable code thereon for wireless communications. The computer readable medium comprises code for detecting one or more conditions associated with at least one metric related to UE power consumption; and transmitting UAI to a network entity, in response to the detection, to request a reconfiguration of the UE to operate according to a set of one or more parameters selected based on a value of the at least one metric.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example wireless communication network, in accordance with certain aspects of the present disclosure.

FIG. 7 depicts example parameters indicated with UE assistance information (UAI), in accordance with certain aspects of the present disclosure.

FIG. 11 is a table which details the conditions and UE procedures for different types of power saving in a SA deployment, in accordance with aspects of the present disclosure.

FIGS. 12 and 13 are a tables with examples of additional parameters and procedures that may be considered in addition to battery level of a UE, in accordance with aspects of the present disclosure.

FIG. 15 is a table which details the conditions and UE procedures for different types of power saving in a NSA deployment, in accordance with aspects of the present disclosure.

FIG. 16 includes tables which detail frequency parameters that may be configured based on UAI, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
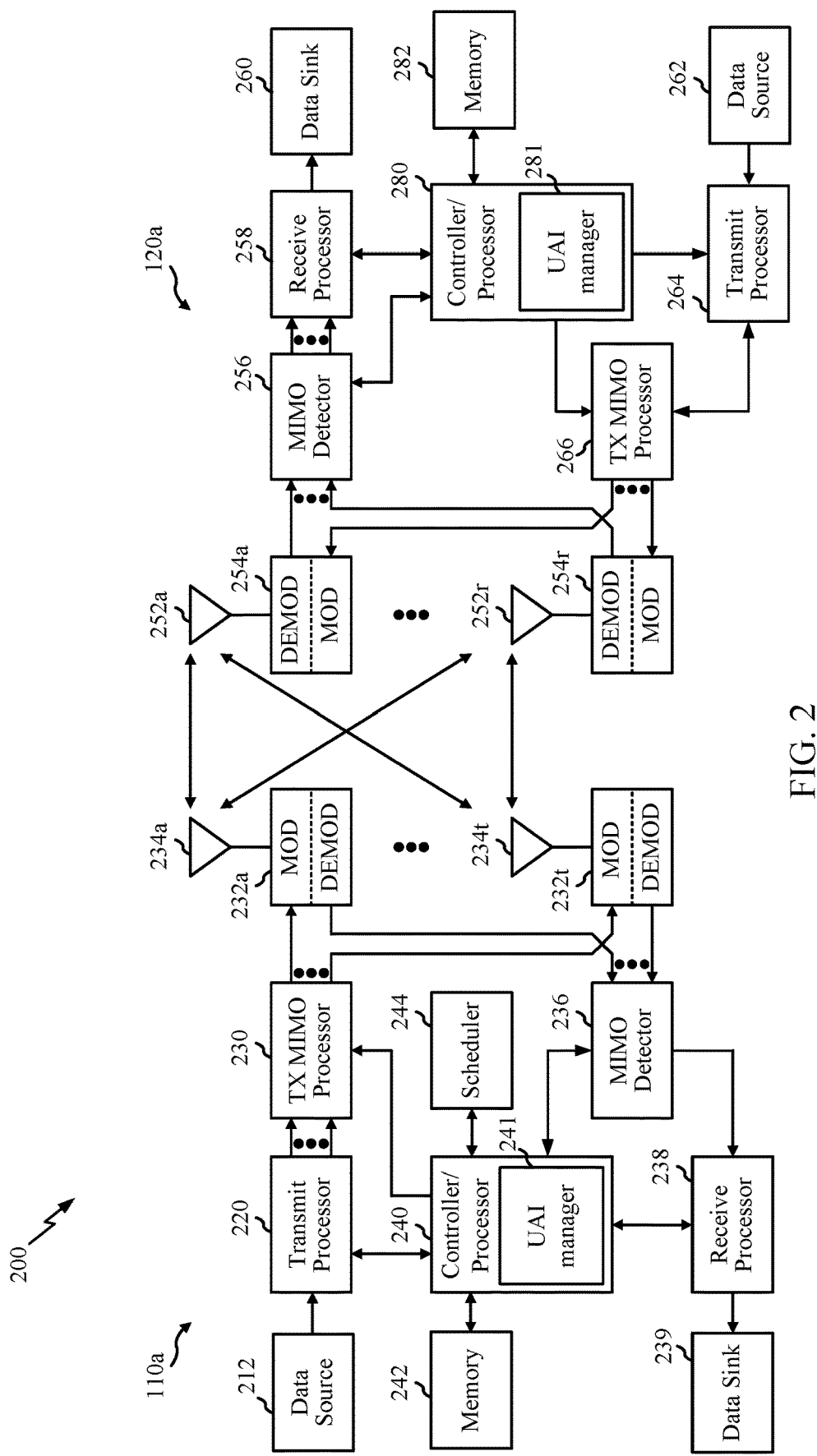
FIG. 2 is a block diagram conceptually illustrating a design of an example a base station (BS) and user equipment (UE), in accordance with certain aspects of the present disclosure.

Aspects of the present disclosure provide techniques for detecting power consumption conditions to trigger transmission of user equipment (UE) assistance information (UAI) for a reconfiguration request. For example, based on comparing a battery level of the UE to various thresholds, a UE may be configured to select different sets of parameters (e.g., a maximum aggregate bandwidth (BW), a maximum number of component carriers (CCs) in one or more cells, and/or a number uplink/downlink multiple input multiple output (MIMO) layers).

Aspects of the present disclosure provide apparatuses, methods, processing systems, and computer readable mediums for detecting various conditions to trigger transmission of UAI for a reconfiguration request based on a set of parameters selected, for example, based on battery level and/or other considerations.

The following description provides examples of detecting power consumption conditions to trigger transmission of UAI for a reconfiguration request. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3rd generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include a UE 120a with a UE assistance information (UAI) manager 122 configured to perform operations 800 of FIG. 8. A BS 110a includes a UAI manager 112 configured to process UAI sent from a UE performing operations 800 of FIG. 8.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a UAI manager 281 that may be configured to perform the operations illustrated in FIG. 9, as well as other operations disclosed herein. For example, as shown in FIG. 2, the controller/processor 240 of the BS 110a has a UAI manager 241 that may be configured to perform operations complementary to those of the UE 120a. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
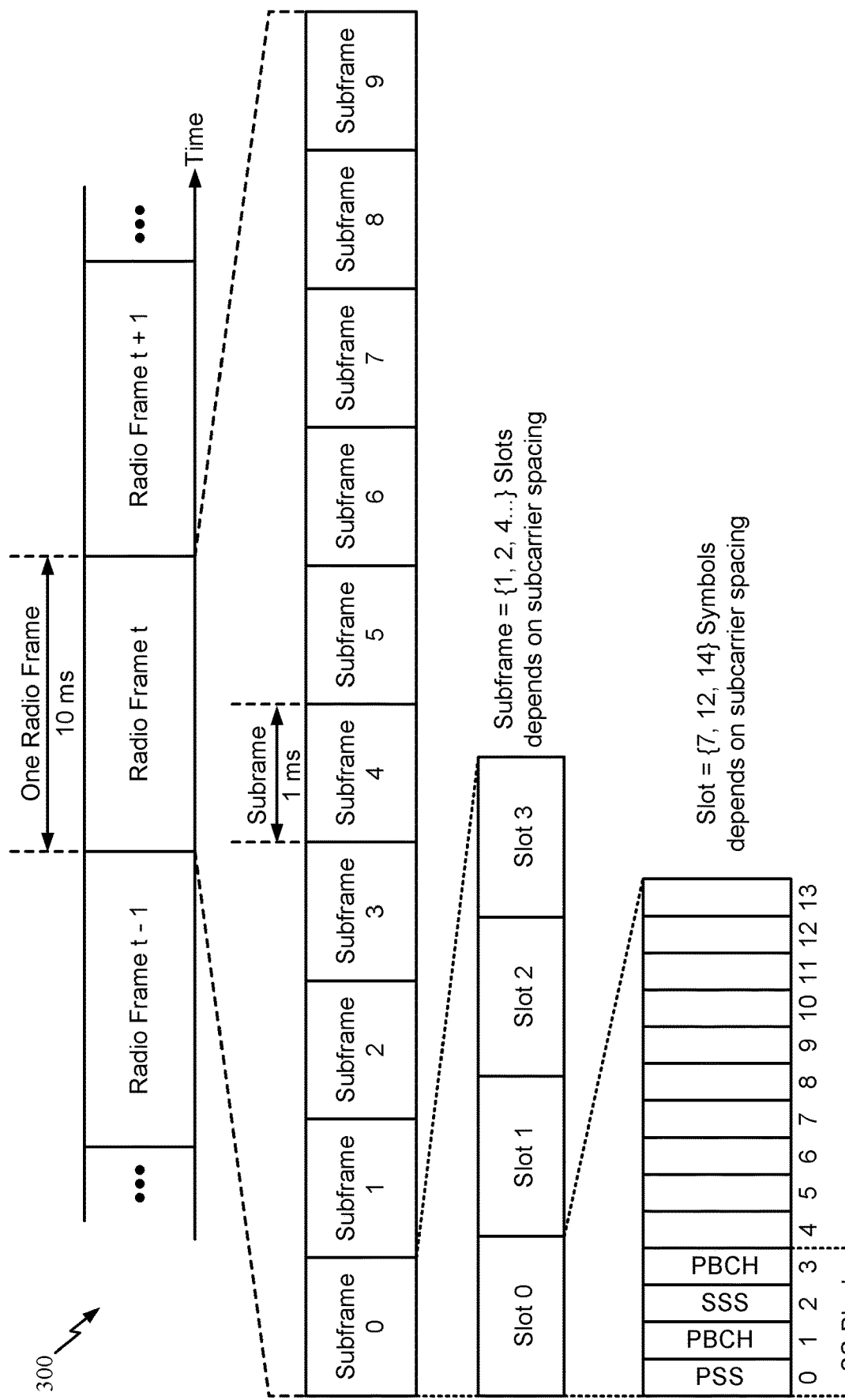
FIG. 3 is an example frame format for certain wireless communication systems (e.g., new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example UE Assistance Information

Figure 4:
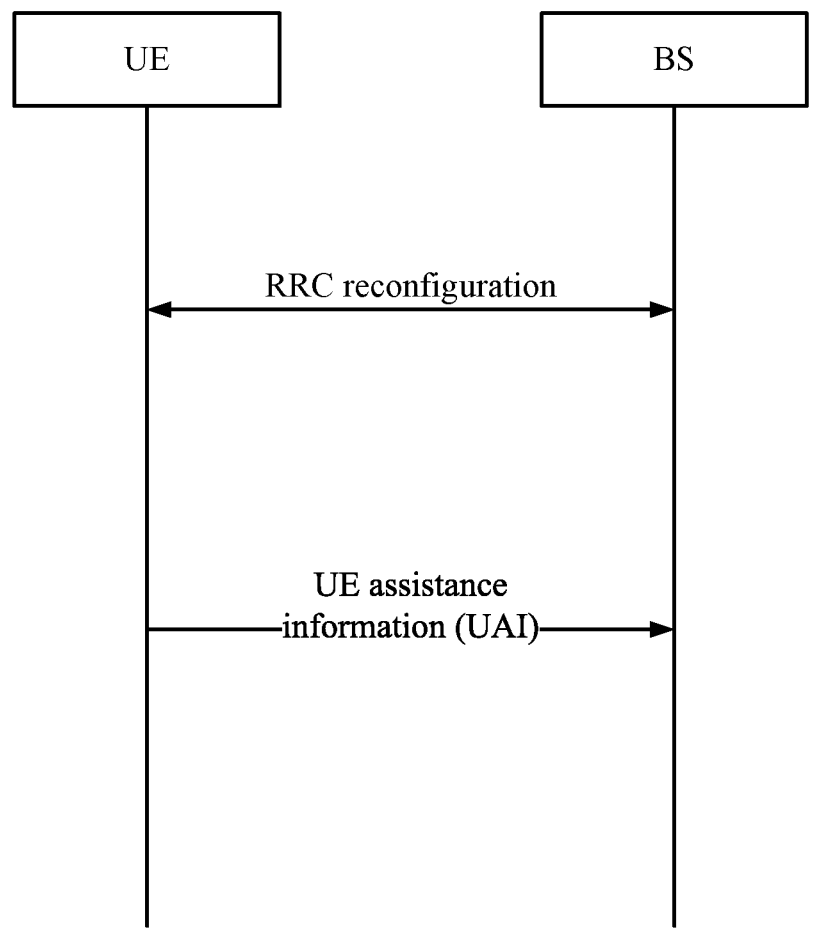
FIG. 4 is a call flow diagram illustrating an example of a UE providing assistance information to a BS, in accordance with certain aspects of the present disclosure.

In certain wireless communication systems (e.g., 5$^{th}$ generation (5G) new radio (NR)), a user equipment (UE) is configured to provide UE assistance information (UAI) to a base station (BS), as shown in FIG. 4. The UE uses the UAI to indicate various parameters such as a maximum aggregate bandwidth (BW), a maximum number of component carriers (CCs) in one or more cells, and/or a number uplink/downlink multiple input multiple output (MIMO) layers, as described in further detail below.

In some cases, the UE capable of providing delay budget reporting in a radio resource control (RRC) state such as a RRC_CONNECTED state initiates a procedure of providing the UAI. For example, the UE initiates the procedure upon being configured to provide the delay budget report and upon change of a delay budget preference. As another example, the UE capable of providing the overheating assistance information in the RRC_CONNECTED state initiates the procedure if the UE is configured to do so, upon detecting internal overheating, or upon detecting that it the UE no longer experiencing an overheating condition.

Example UAI for Battery Power Saving

Certain aspects of the present disclosure provide techniques for detecting power consumption conditions to trigger transmission of user equipment (UE) assistance information (UAI) to convey a reconfiguration request. For example, based on a battery level of the UE compared to various thresholds, a UE may be configured to select different sets of parameters (e.g., a maximum aggregate bandwidth (BW), a maximum number of component carriers (CCs) in one or more cells, and/or a number uplink/downlink multiple input multiple output (MIMO) layers) and transmit UAI to request reconfiguration to operate according to the selected parameters.

Currently (e.g., in Release-16), standards have provided details for some UAI to request some value of the parameters to be used for power saving. This is illustrated in FIGS. 5 and 6, which are call flow diagrams illustrating an example of a UE providing assistance information to a BS based on a trigger in a standalone (SA) deployment and a non-SA (NSA) deployment, respectively.

Figure 5:
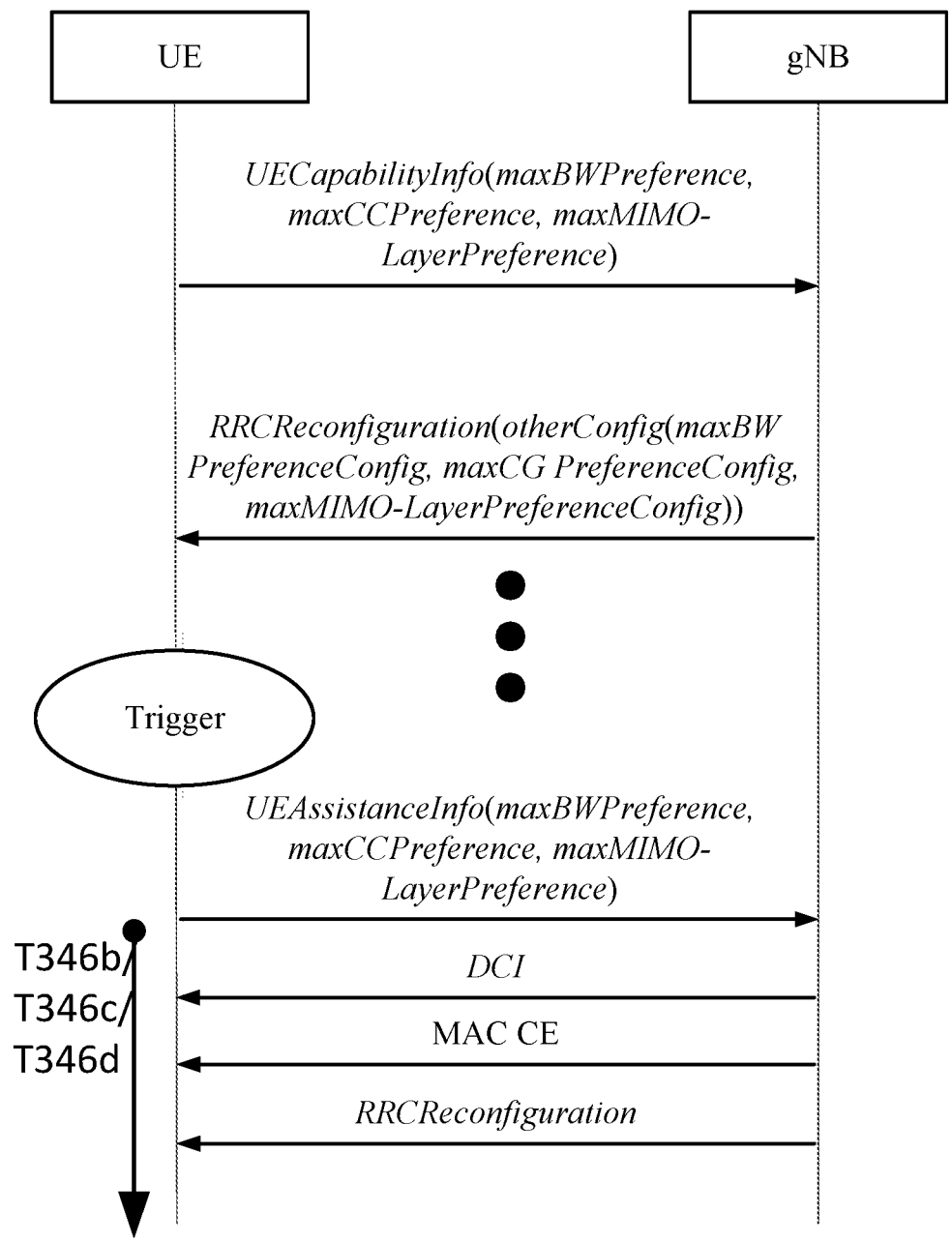
FIG. 5 is a call flow diagram illustrating an example of a UE providing assistance information to a BS based on a trigger in a standalone deployment, in accordance with certain aspects of the present disclosure.
Figure 6:
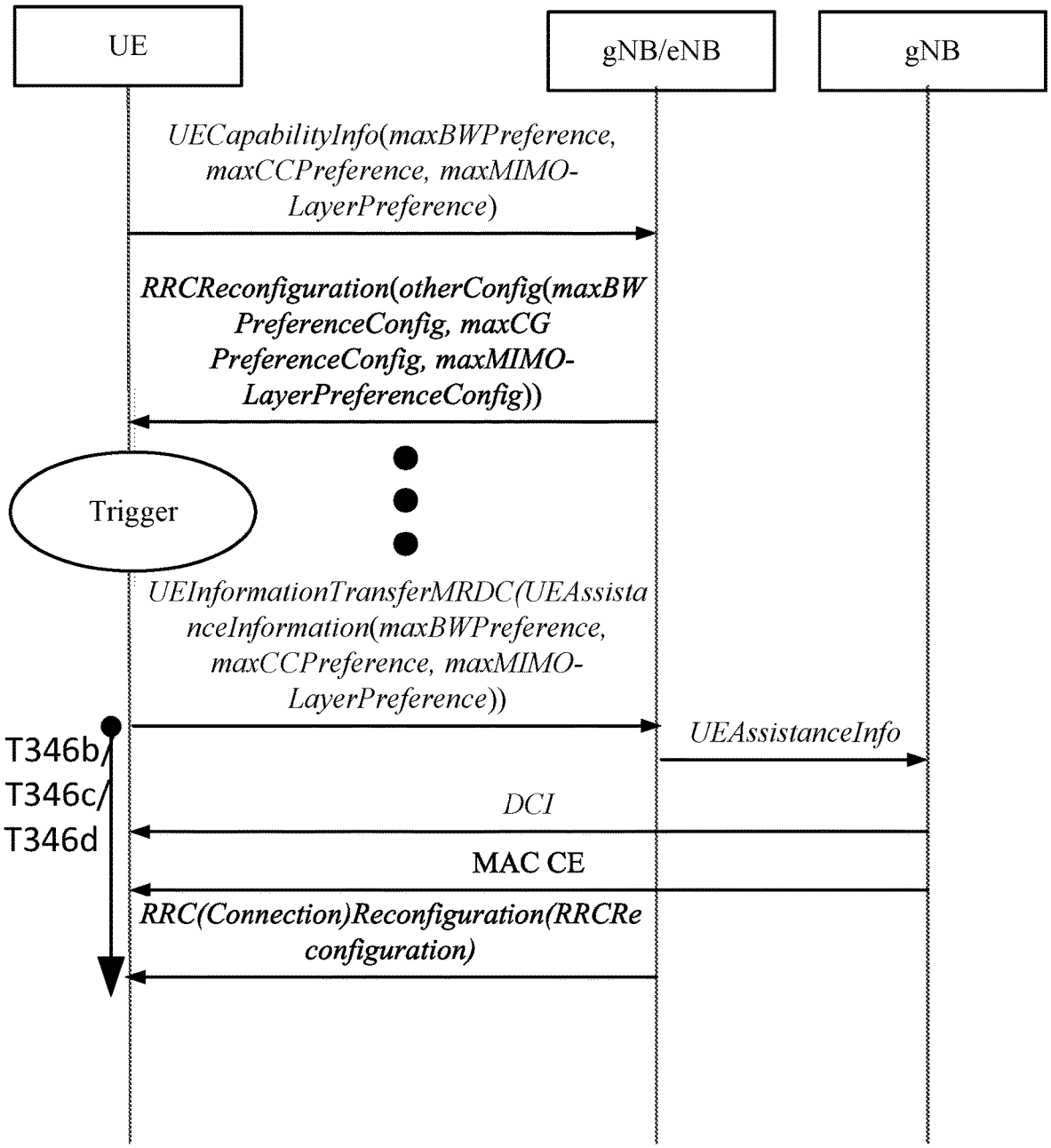
FIG. 6 is a call flow diagram illustrating an example of a UE providing assistance information to a BS based on a trigger in a non-standalone deployment, in accordance with certain aspects of the present disclosure.

As shown in FIG. 5, the network (e.g., via a gNB) may configure the UE with certain parameters, based on UE capability information reported by the UE. For example, the gNB may configure the UE with maximum bandwidth, maximum number of component carriers, and a maximum number of MIMO layers. Each of these parameters may have impact on UE power consumption.

Therefore, it may be beneficial, if the UE detects a trigger condition (e.g., based on low batter level) to send UAI indicated a reduced maximum aggregate BW, a maximum number of CCs, and a maximum number of MIMO layers (e.g., for a fifth generation (5G) SA deployment) relative to currently configured values.

In some cases, if the UE wants to recover from a reduced state of the variables described above, the UE can send another UAI with an empty information element (IE). As shown, the gNB transmits downlink control information (DCI) (e.g., for a BWP switch to another active BWP meeting the request by the UE), media access control (MAC) control element (CE) (e.g., to put a CC in a deactivated state), or a RRC reconfiguration (e.g., to release a CC and/or reconfigure MaxMIMO-Layer) to reconfigure various parameters.

In some cases, various timers configured by the network (e.g., PreferenceProhibitTimer), during which the UE may not send a setting request for the same purpose. In this regard, a timer T346b may be for a maxBW-PreferenceProhibitTimer, a timer T346c may be for a maxCC-PreferenceProhibitTimer, and a timer T346d may be for a maxMIMO-LayerPreferenceProhibitTimer.

The techniques described with respect to FIG. 5 may similarly apply to a NSA deployment, as shown in FIG. 6. As illustrated, in the NSA case, a gNB or eNB may forward UE assistance information from the UE to another gNB.

The various parameters signaled in FIGS. 5 and 6 are illustrated may be further understood in light of FIG. 7, depicts example code provided further detail for the various parameters indicated. The parameters shown in FIG. 7 are for illustrative purposes only and different parameters may be signaled via UAI (e.g., in addition to or as an alternative to parameters shown in FIG. 7).

Aspects of the present disclosure provide mechanisms for triggering the transmission of UAI for a reconfiguration request, based on various conditions related to power consumption. As will be described herein, depending on battery level, relatively moderate or more aggressive reductions in parameters that may have an impact on power consumption may be requested.

Figure 8:
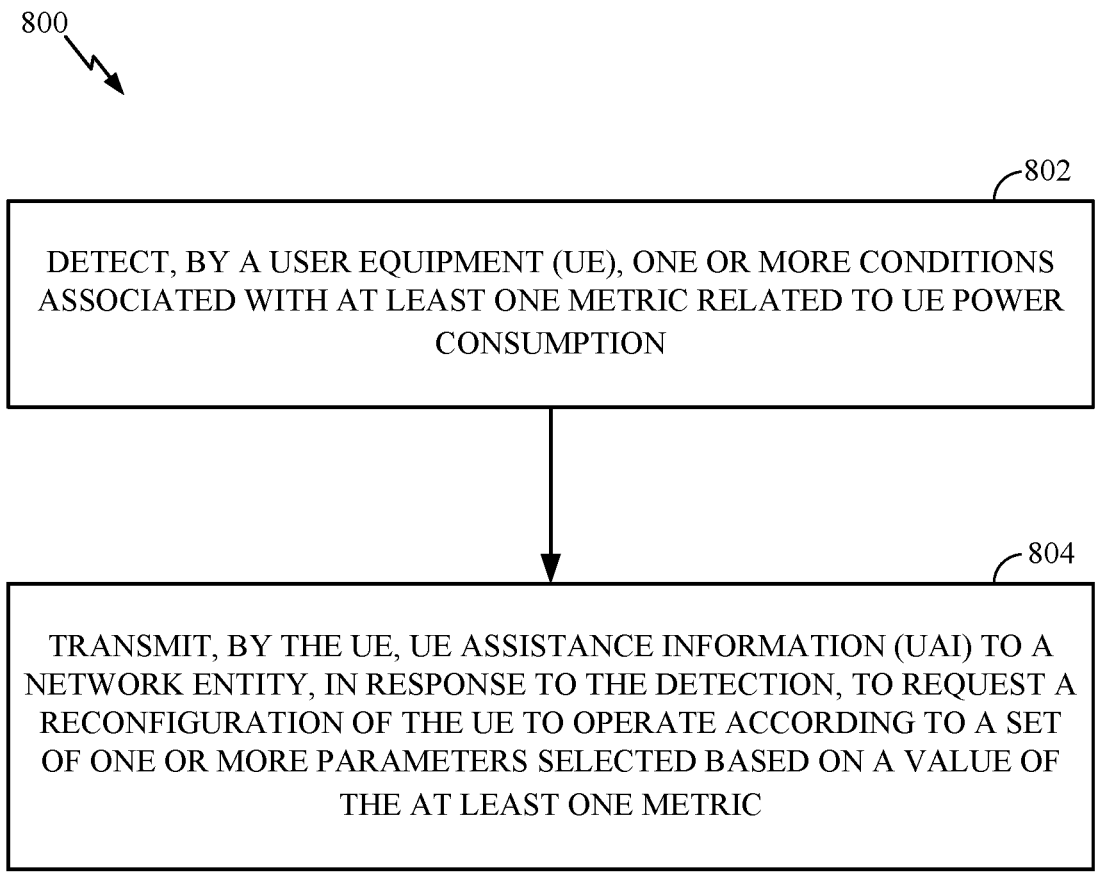
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100) for detecting power consumption conditions to trigger transmission of user equipment UAI for a reconfiguration request from a network entity (e.g., the BS 110a in the wireless communication network 100). The operations 800 may be implemented as software components that are executed and run on one or more processors (e.g., the controller/processor 280 of FIG. 2). Further, the transmission and reception of signals by the UE in operations 800 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 800 begin, at 802, by detecting one or more conditions associated with at least one metric related to UE power consumption. At 804, the UE transmits UAI to a network entity, in response to the detection, to request a reconfiguration of the UE to operate according to a set of one or more parameters selected based on a value of the at least one metric.

The operations shown in FIG. 8 are further described with reference to FIG. 9, which is a call flow diagram illustrating example signaling 900 for transmitting UAI to request a reconfiguration for the UE based on a detected trigger associated with UE power consumption (e.g., in a SA deployment), in accordance with aspects of the present disclosure.

Figure 9:
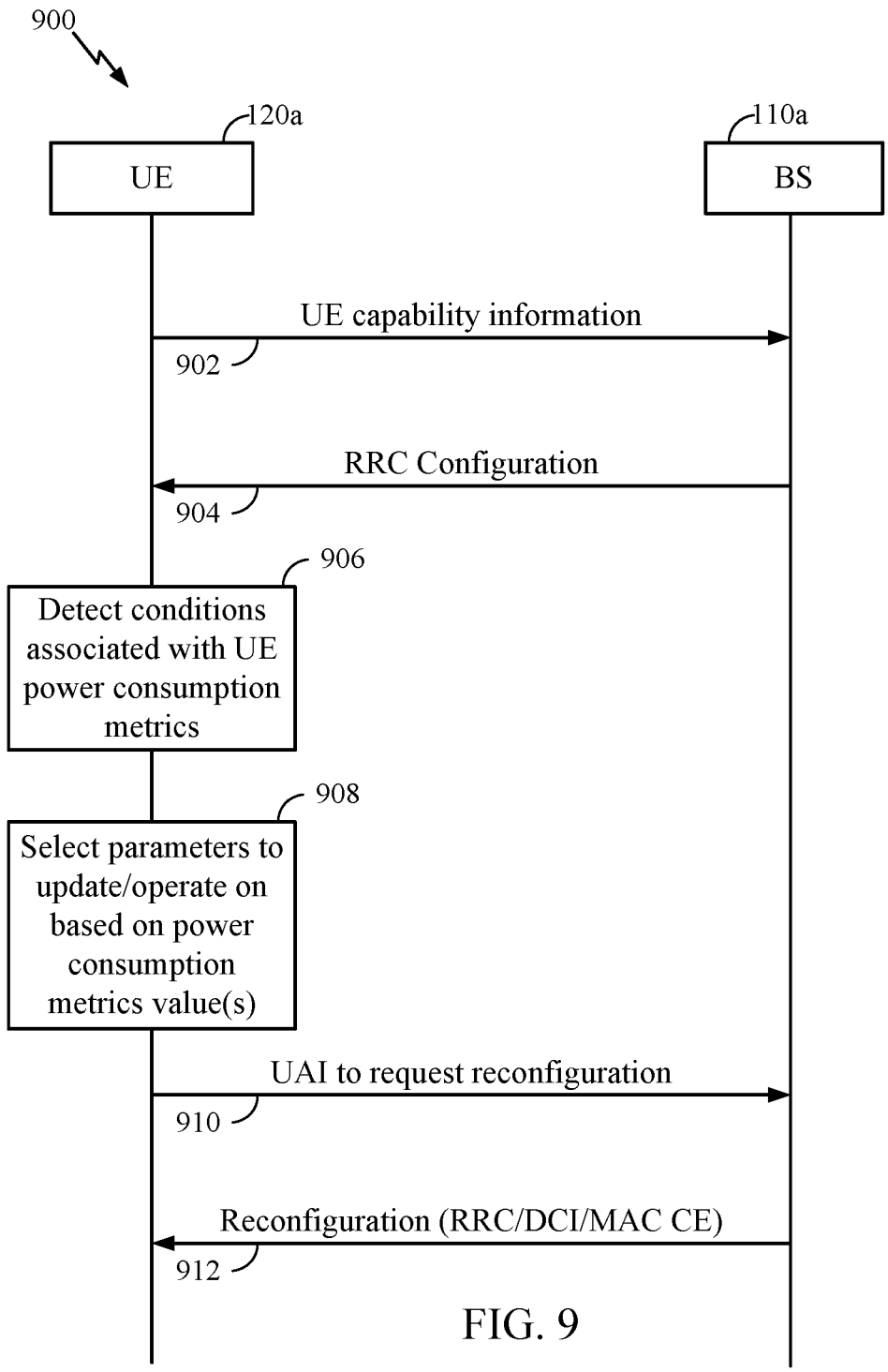
FIG. 9 is a call flow diagram illustrating example signaling for transmitting UAI to request a reconfiguration for the UE based on a detected trigger associated with UE power consumption, in accordance with aspects of the present disclosure.

As illustrated in FIG. 9, at 902, a UE 120a transmits, at 902, capability information such as preferred maximum BW and/or a preferred maximum number of CCs, and/or a preferred maximum number of MIMO layers to which the BS 110a responds, at 904, with a RRC configuration based on the preferred parameters the UE signals in the capability information.

At 906, the UE 120a detects one or more conditions associated with UE power consumption metrics (e.g., a battery level of the UE 120a). At 908, the UE 120a selects parameters (e.g., a maximum aggregate BW, a maximum number of CCs in one or more cells, and/or a maximum number of uplink/downlink MIMO layers) to update and operate on based on the power consumption metrics value(s).

At 910, the UE 120a transmits UAI to the BS 110a, in response to the detection and selection, to request a reconfiguration to operate according to the selected parameters. At 912, the BS 110a transmits a reconfiguration to the UE 120a based on the UAI. Although a SA deployment is depicted in FIG. 9, it should be understood that the signaling 900 and operations of FIG. 9 may be similarly implemented in a NSA deployment (e.g., where the UAI is forwarded to another BS different from the BS 110a).

As described in more detail below with respect to FIGS. 10-16, the UE 120a may use various conditions such as one or more thresholds to select the parameters.

Figure 10:
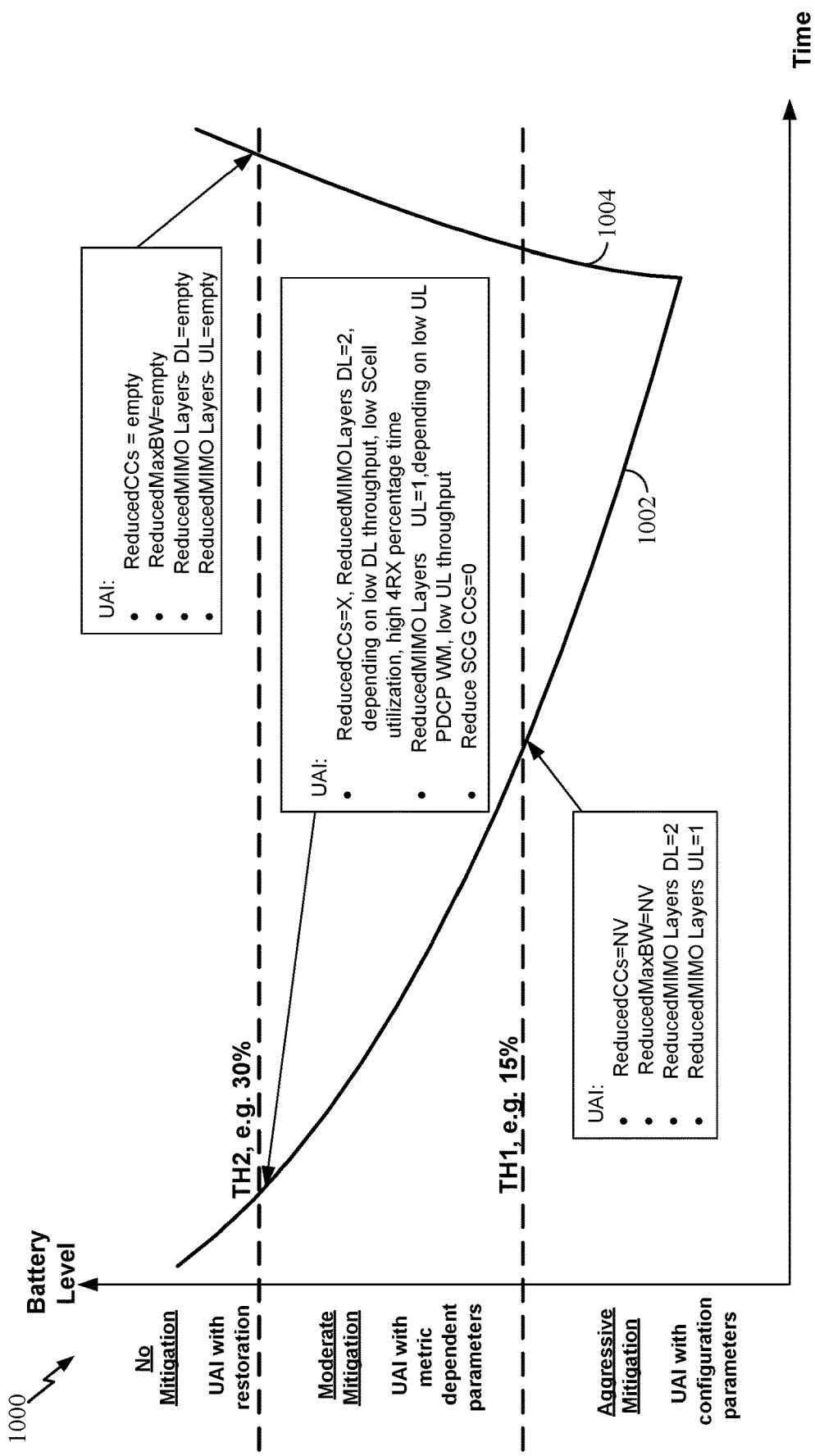
FIG. 10 illustrates how battery level thresholds may be used to trigger UAI transmissions, in accordance with aspects of the present disclosure.

FIG. 10 illustrates how UAI transmission may be triggered based on (rising or falling) battery level of a UE. As illustrated, different battery level thresholds may be used to determine what parameters to indicate in UAI.

As illustrated if the battery level is above a first threshold level (TH2 (e.g., representing 30% of battery level remaining), there may be no need for mitigation. If the battery levels fall below TH2, however, the UE may perform moderate mitigation to try and reduce power consumption, for example, by transmitting UAI to request a reduction in one or more parameters (e.g., to reduce the aggregated BW, the number of CCs, and/or the number of uplink/downlink MIMO layers).

As illustrated, if the battery level continues to fall below a second threshold level (TH1), the UE may take more aggressive mitigation measures. For example, the UE may send UAI to request even further reductions in CCs, Max bandwidth, uplink and/or downlink MIMO layers.

As illustrated, if the battery level again rises above TH2, the UE may again transmit UAI, but in this case to restore previous settings. As illustrated, in some cases, sending UAI with empty fields may indicate the UE is requesting a reconfiguration to previous parameters.

FIG. 11 illustrates, in table form, the various levels of mitigation shown graphically in FIG. 10.

As shown, in a first case of aggressive mitigation, an associated condition may include the battery level of the UE is below some first threshold TH1 (e.g., 15% battery remaining) and the UE is not connected to an AC adapter (e.g., a charger). In this first case, as shown, the UE may transmit UAI to reduce the aggregated BW, the number of CCs, and/or the number of MIMO layers (for downlink and/or uplink) according to a non-volatile configuration.

In a second case of moderate mitigation, the condition may be that the battery life of the UE is between the first threshold TH1 and a second threshold TH2 (e.g., 30%), the UE is not connected to an AC adapter, and there is no indication of a performance issue (e.g., no data stall, long latency, etc.). If TH1 is equal to TH2, then the second case may not apply. If TH1 is not equal to TH2 (e.g., TH2>TH1, as shown in FIG. 10), the UE may send UAI to a SCG release the SCG. The UE may, additionally or alternatively, send UAI to the MCG to reduce the aggregated BW, the number of CCs, and/or the number of MIMO layers. In this case, the UAI may be further based on additional metrics, as described below with respect to FIGS. 12 and 13.

In a third case of no mitigation, the condition may be that the battery level of the UE is greater than or equal to the second threshold TH2. In this case, the fields of the UAI for reduced BW, number of CCs, and MIMO layers may be empty to indicate the UE wishes to recover from a reduced state.

In some cases, factors other than battery level may be considered when triggering UAI transmission to request reconfiguration.

For example, FIGS. 12 and 13 are a tables which detail additional parameters and procedures that may be considered in addition to battery level of the UE, in accordance with aspects of the present disclosure. Further, the additional metrics may be considered in the second case described above where the battery level of the UE is between the first threshold TH1 and the second threshold TH2.

As shown in FIG. 12, the additional metrics may include downlink throughput D (e.g., downlink throughput in last T period of time). For example, the downlink throughput D may be compared to some threshold TH_D (e.g., 5 Mbps), and if D is less than TH_D, this may be considered as low downlink throughput. As another example, the UE may consider the SCell utilization of an activated SCC(j) (denoted U(j)), where U(j) is the number of slots with downlink or uplink grants and/or the number of slots during connected mode discontinuous reception (CDRX) awake time (e.g., during the last T period of time). In this regard, SCell utilization of SCC(j) may be considered low then U(j) is less than some threshold TH U (e.g., 10%). As yet another example, a four antenna reception (4RX) percentage time may be considered, where 4RxOnPercentage(k) is the percentage of time using 4RXs of CC #k of the cell group, over last T period of time. In this example, a variable R may equal min k{4RxOnPercentage(k)}, where the 4RX percentage time may be considered high when R is greater than some threshold TH_R (e.g., 25%).

As shown in the table of FIG. 12, based on various combinations of the additional metrics, the UE may take actions according to which of the conditions are met. For example, if SCell utilization is low, the UE may send UAI to reduce the number of CCs. If the downlink throughput is low and the 4RX percentage time is high, the UE may send UAI to reduce the downlink MIMO layers (e.g., to be 2 MIMO layers). Otherwise, the UE may restore the number of CCs, and/or the number of downlink MIMO layers, if it has been reduced. For example, if the downlink throughput is low or the 4RX percentage time is not high, the UE may restore the downlink MIMO layers (e.g., to be 4 downlink MIMO layers). Similarly, if the SCell utilization is not low, the UE may restore number of CCs.

As shown in FIG. 13, the additional metrics/conditions may further include whether a modem is not in a low latency mode, an uplink packet data convergence protocol (PDCP) watermark (WM) (e.g., denoted as W), and/or uplink throughput (e.g., during the last T period of time, denoted as A). In some cases, UL throughput may be considered low when the uplink throughput A is less than some threshold TH_A. The uplink PDCP WM may be the maximum uplink PDCP WM of all data resource blocks (DRBs) in the last T period of time. The uplink PDCP WM may be considered low when the uplink PDCP WM is less than some threshold TH_W.

As shown in the table of FIG. 13, based on various combinations of the additional metrics, the UE may take actions according to the combination of conditions met. For example, if the modem is not in a low latency mode, the uplink PDCP WM is low, and the uplink throughput is low, the UE may send UAI to reduce the uplink MIMO layers (e.g., reduce to 1). Otherwise, the UE may restore the number of uplink MIMO layers, if it is reduced. For example, if the modem is in a low latency mode, or the uplink PDCP WM is not low, or the uplink throughput is not low, the UE may restore the number of uplink MIMO layers (e.g., to be 2 uplink MIMO layers).

Figure 14:
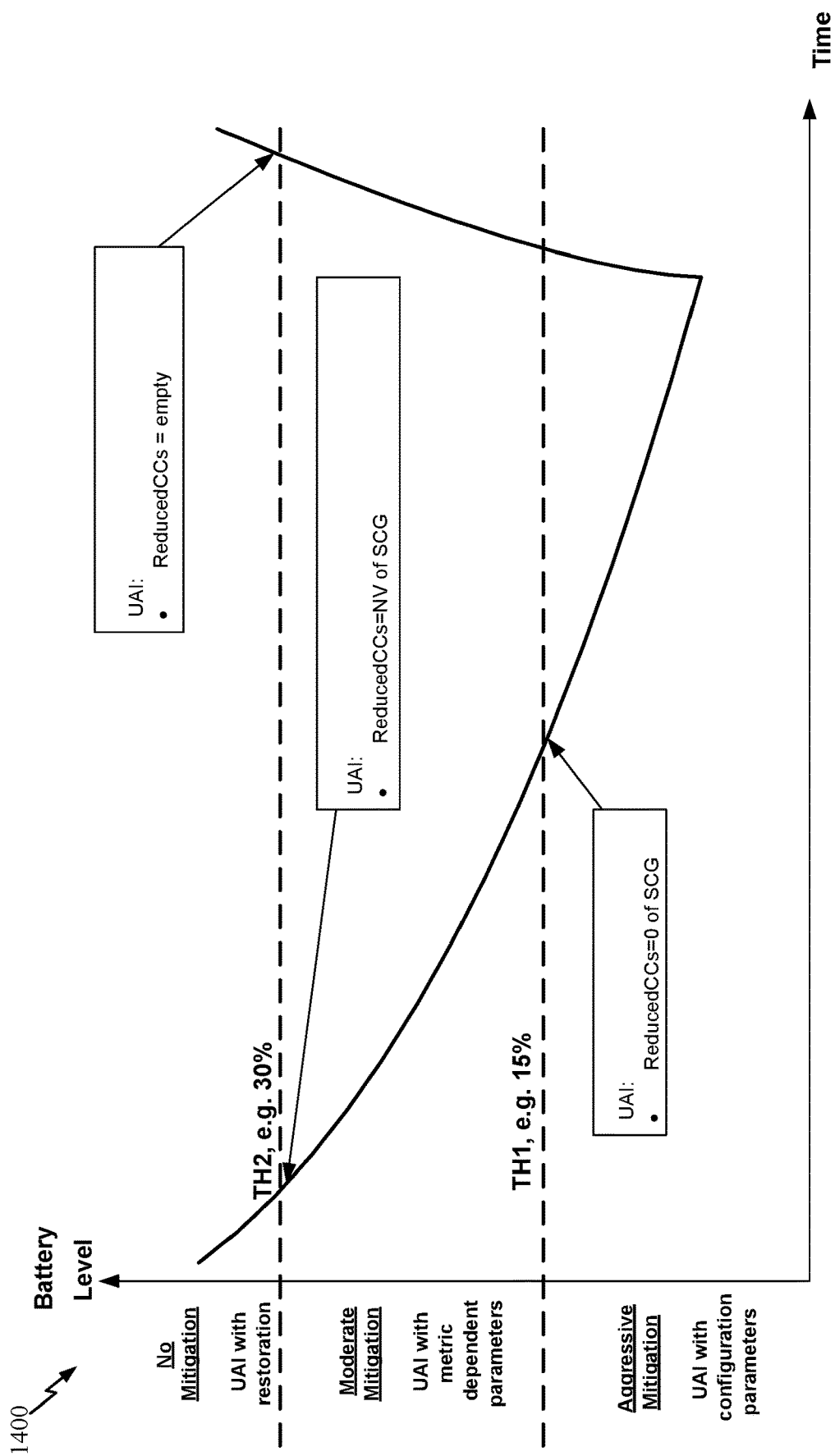
FIG. 14 illustrates how battery level thresholds may be used to trigger UAI transmissions, in accordance with aspects of the present disclosure.

FIG. 14 illustrates how UAI transmission may be triggered based on (rising or falling) battery level of a UE, for an NSA scenario. As with the example described above with reference to FIG. 10, different battery level thresholds may be used to determine what parameters to indicate in UAI.

As shown, the UE may use its own battery level (indicated via associated metrics) to determine how to send UAI. This may be further understood in light of FIG. 15, which is a table that details the conditions and UE procedures for different types of power saving (e.g., in a NSA deployment).

As shown, in a first case of aggressive mitigation, an associated condition may include the battery level of the UE is below some first threshold TH1 (e.g., 15%) and that the UE is not connected to an AC adapter (e.g., a charger). In this first case, as shown, the UE may transmit UAI to a SCG to reduce the number of CCs to release the SCG.

In a second case of moderate mitigation, the condition may be that the battery life of the UE is between the first threshold TH1 and a second threshold TH2 (e.g., 30%), the UE is not connected to an AC adapter, and there is no indication of a performance issue (e.g., no data stall, long latency, etc.). If TH1 is equal to TH2, then the second case may not apply. In the case where TH1 is not equal to TH2 (e.g., TH2>TH1, as shown in FIG. 14), the UE may send UAI to reduce the number of CCs in accordance with a non-volatile (NV) configuration.

For example, as shown in FIG. 16, for each NV parameter, various frequency ranges and bit ranges may be permitted according to standard specifications, and certain default values may be used by a UE. That is, as indicated in table 1600A, NV parameters for a SA deployment may be associated with frequency ranges, bit ranges, and default values, and as indicated in table 1600B, NV parameters for a NSA deployment may be associated with bit ranges and default values.

Returning back to FIG. 15, in a third case of no mitigation, the condition may be that the battery level of the UE is greater than or equal to the second threshold TH2. In this case, the field of the UAI sent to the SCG for the number of CCs, and MIMO layers may be empty.

In certain aspects, if the UE sends UAI that includes a combined reducedCC and reducedBW, the UE can opt to reduce a particular CC. For example, consider the case of a primary CC (PCC) is 50 MHz, a secondary CC 1 (SCC1) is 50 MHz, and a SCC2 is 20 MHz. If the UE indicates reducedCC=1 (i.e. reduce to PCell and only one SCell) and reducedBW=100 MHz, then PCC and SCC1 may be kept, and SCC2 may be released to reduce the number of CCs and stay within the reduced aggregate BW. If the UE indicates reducedCC=1 and reducedBW=80 MHz, then PCC and SCC2 are may be kept, and SCC1 may be released to reduce the number of CCs and stay within the reduced aggregate BW.

In some cases, instead of the configuration parameter value(s) being configurable at the UE, the values can be dynamically provided by a high-level operating system (HLOS) or an application via a modem control interface. In this regard, the battery level (and any other metrics being considered) and which conditions are met can be determined by the HLOS or the application, and either of which may send a command to a modem to trigger sending UAI via the modem control interface. Furthermore, parameter values can be commanded/configured depending on the frequency range (FR) (e.g., FR1 versus FR2) in which the UE is operating.

Thus, by leveraging various metrics of the UE, UE power consumption can be saved by requesting the network to put one or more CCs into a deactivated state, release a SCell, reconfigure the UE in a reduced BW, or smaller MIMO layers. Accordingly, the UE can maintain a reduced power consumption while still keeping data transmissions.

Example Communications Devices

Figure 17:
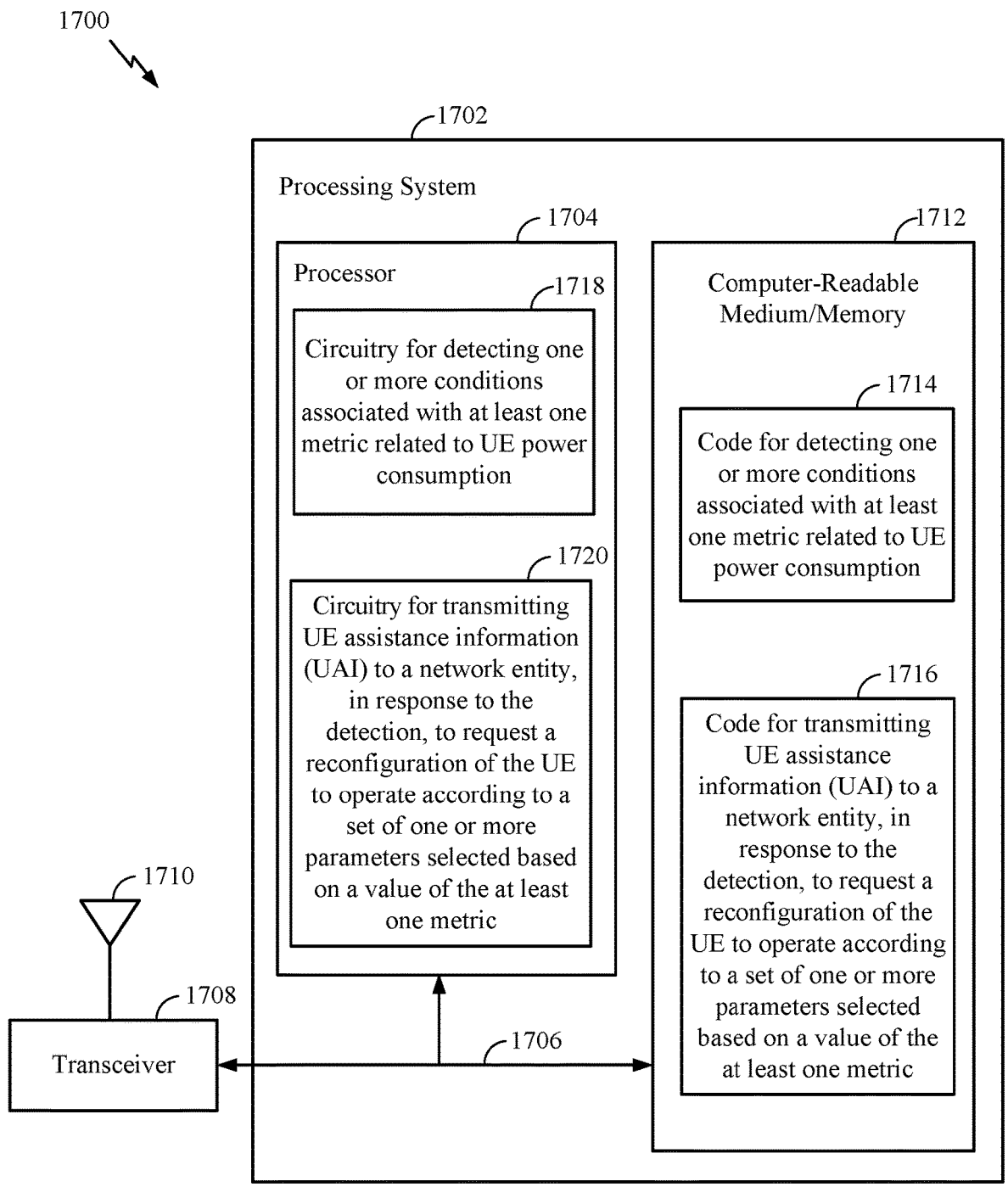
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 9. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 1704, cause the processor 1704 to perform the operations illustrated in FIG. 9, or other operations for performing the various techniques discussed herein. In certain aspects, computer-readable medium/memory 1712 stores code 1714 for detecting one or more conditions associated with at least one metric related to UE power consumption; and code 1716 for transmitting UE assistance information (UAI) to a network entity, in response to the detection, to request a reconfiguration of the UE to operate according to a set of one or more parameters selected based on a value of the at least one metric. The processor 1704 may include circuitry configured to implement the code stored in the computer-readable medium/memory 1712, such as for performing the operations illustrated in FIG. 9, as well as other operations for performing the various techniques discussed herein. For example, the processor 1704 includes circuitry 1718 for detecting one or more conditions associated with at least one metric related to UE power consumption; and circuitry 1720 for transmitting UAI to a network entity, in response to the detection, to request a reconfiguration of the UE to operate according to a set of one or more parameters selected based on a value of the at least one metric.

Example Aspects

Implementation examples are described in the following numbered aspects.

Aspect 1. A method for wireless communications by a user equipment (UE), comprising detecting one or more conditions associated with at least one metric related to UE power consumption; and transmitting UE assistance information (UAI) to a network entity, in response to the detection, to request a reconfiguration of the UE to operate according to a set of one or more parameters selected based on a value of the at least one metric.

Aspect 2. The method of Aspect 1, wherein the at least one metric comprises battery level of the UE; and the UE is configured to select different sets of parameters depending on whether the battery level of the UE is: below a first threshold, above a second threshold, or between the first and second threshold.

Aspect 3. The method of Aspect 2, wherein the set of parameters comprises at least one of: a maximum aggregate bandwidth or a maximum number of component carriers (CCs) in one or more cells.

Aspect 4. The method of Aspect 3, wherein the set of parameters further comprise at least one of a number of uplink multiple input multiple output (MIMO) layers or a number of downlink MIMO layers.

Aspect 5. The method of Aspect 3 or 4, wherein the UE is configured to select a first set of parameters, in response to detecting the battery level has fallen below the second threshold, wherein the first set of parameters represent a reduction in bandwidth relative to a current configuration; and select a second set of parameters, in response to detecting the battery level has fallen below the first threshold, wherein the first set of parameters represent a reduction in bandwidth relative to the first set of parameters.

Aspect 6. The method of any of Aspects 3-5, wherein the UE is further configured to select a third set of parameters, in response to detecting the battery level has risen above the first threshold, wherein the third set of parameters represent an increase in bandwidth relative to both the first and second sets of parameters.

Aspect 7. The method of Aspect 6, wherein the UE indicates selection of the third set of parameters by sending UAI with one or more empty fields.

Aspect 8. The method of any of Aspects 3-7, wherein the UE indicates, in the UAI whether the set of parameters are to apply to: a master cell group (MCG), a secondary cell group (SCG), or both the MCG and SCG.

Aspect 9. The method of any of Aspects 3-8, wherein the at least one metric further comprises at least one of metric indicative of downlink throughput or secondary cell utilization.

Aspect 10. The method of any of Aspects 3-9, wherein the set of parameters comprises a reduced number of CCs and a reduced bandwidth chosen by the UE to reduce bandwidth in a particular CC.

Aspect 11. The method of any of Aspects 1-10, wherein values for at least some of the parameters are configurable at the UE.

Aspect 12. The method of Aspect 11, wherein values for at least some of the parameters are provided by at least one of a high level operating system (HLOS) or application via a modem interface.

Aspect 13. The method of Aspect 11 or 12, wherein a command to transmit the UAI is provided by at least one of a HLOS or application via a modem interface.

Aspect 14. The method of Aspect 11, wherein values for at least some of the parameters depend, at least in part, on a frequency range (FR) in which the UE is operating.

Aspect 15: An apparatus, comprising: a memory comprising executable instructions; and one or more processors configured to execute the executable instructions and cause the apparatus to perform a method in accordance with any one of Aspects 1-14.

Aspect 16: An apparatus, comprising means for performing a method in accordance with any one of Aspects 1-14.

Aspect 17: A non-transitory computer-readable medium comprising executable instructions that, when executed by one or more processors of an apparatus, cause the apparatus to perform a method in accordance with any one of Aspects 1-14.

Aspect 18: A computer program product embodied on a computer-readable storage medium comprising code for performing a method in accordance with any one of Aspects 1-14.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   detecting one or more conditions associated with at least one metric related to UE power consumption, wherein the at least one metric comprises a battery level of the UE; and
   transmitting UE assistance information (UAI) to a network entity, in response to the detection, to request a reconfiguration of the UE to operate according to a set of one or more parameters selected based on a value of the at least one metric, wherein the selection comprises:
      selecting a first set of parameters, in response to detecting the battery level has fallen below a second threshold, wherein the first set of parameters represent a reduction in bandwidth relative to a current configuration; and
      selecting a second set of parameters, in response to detecting the battery level has fallen below a first threshold, wherein the second set of parameters represent a reduction in bandwidth relative to the first set of parameters.

2. The method of claim 1, wherein:
   the set of one or more parameters comprises at least one of: a maximum aggregate bandwidth or a maximum number of component carriers (CCs) in one or more cells.

3. The method of claim 2, wherein:
   the set of one or more parameters further comprise at least one of a number of uplink multiple input multiple output (MIMO) layers or a number of downlink MIMO layers.

4. The method of claim 1, wherein the selection further comprises selecting a third set of parameters, in response to detecting the battery level has risen above the first threshold, wherein the third set of parameters represent an increase in bandwidth relative to both the first and second sets of parameters.

5. The method of claim 4, further comprising indicating the selection of the third set of parameters by sending UAI with one or more empty fields.

6. The method of claim 1, further comprising indicating in the UAI whether the set of one or more parameters are to apply to: a master cell group (MCG), a secondary cell group (SCG), or both the MCG and SCG.

7. The method of claim 1, wherein the at least one metric further comprises at least one of metric indicative of downlink throughput or secondary cell utilization.

8. The method of claim 1, wherein:
   the set of one or more parameters comprises a reduced number of component carriers (CCs) and a reduced bandwidth chosen by the UE to reduce bandwidth in a particular CC.

9. The method of claim 1, wherein values for at least some parameters of the set of one or more parameters are configurable at the UE.

10. The method of claim 9, wherein values for at least some parameters of the set of one or more parameters are provided by at least one of a high level operating system (HLOS) or application via a modem interface.

11. The method of claim 9, wherein a command to transmit the UAI is provided by at least one of a high level operating system (HLOS) or application via a modem interface.

12. The method of claim 9, wherein values for at least some parameters of the set of one or more parameters depend, at least in part, on a frequency range (FR) in which the UE is operating.

13. An apparatus for wireless communications by a user equipment (UE), comprising:
   a memory; and
   at least one processor coupled to the memory, the at least one processor and memory being configured to:
      detect one or more conditions associated with at least one metric related to UE power consumption, wherein the at least one metric comprises a battery level of the UE; and
      transmit UE assistance information (UAI) to a network entity, in response to the detection, to request a reconfiguration of the UE to operate according to a set of one or more parameters selected based on a value of the at least one metric, wherein the selection comprises:
         selecting a first set of parameters, in response to detecting the battery level has fallen below a second threshold, wherein the first set of parameters represent a reduction in bandwidth relative to a current configuration; and
         selecting a second set of parameters, in response to detecting the battery level has fallen below a first threshold, wherein the second set of parameters represent a reduction in bandwidth relative to the first set of parameters.

14. The apparatus of claim 13, wherein:
   the set of one or more parameters comprises at least one of: a maximum aggregate bandwidth or a maximum number of component carriers (CCs) in one or more cells.

15. The apparatus of claim 14, wherein:
   the set of one or more parameters further comprise at least one of a number of uplink multiple input multiple output (MIMO) layers or a number of downlink MIMO layers.

16. The apparatus of claim 13, wherein the selection further comprises selecting a third set of parameters, in response to detecting the battery level has risen above the first threshold, wherein the third set of parameters represent an increase in bandwidth relative to both the first and second sets of parameters.

17. The apparatus of claim 16, wherein the apparatus is further configured to indicate selection of the third set of parameters by sending UAI with one or more empty fields.

18. The apparatus of claim 13, wherein the apparatus is further configured to indicate, in the UAI whether the set of one or more parameters are to apply to: a master cell group (MCG), a secondary cell group (SCG), or both the MCG and SCG.

19. The apparatus of claim 13, wherein the at least one metric further comprises at least one of metric indicative of downlink throughput or secondary cell utilization.

20. The apparatus of claim 13, wherein:
   the set of one or more parameters comprises a reduced number of component carriers (CCs) and a reduced bandwidth chosen by the UE to reduce bandwidth in a particular CC.

21. The apparatus of claim 13, wherein values for at least some parameters of the set of one or more parameters are configurable at the UE.

22. The apparatus of claim 21, wherein values for at least some parameters of the set of one or more parameters are provided by at least one of a high level operating system (HLOS) or application via a modem interface.

23. The apparatus of claim 21, wherein a command to transmit the UAI is provided by at least one of a high level operating system (HLOS) or application via a modem interface.

24. The apparatus of claim 21, wherein values for at least some parameters of the set of one or more parameters depend, at least in part, on a frequency range (FR) in which the UE is operating.

25. An apparatus for wireless communication by a user equipment (UE), comprising:
- means for detecting one or more conditions associated with at least one metric related to UE power consumption, wherein the at least one metric comprises a battery level of the UE; and
- means for transmitting UE assistance information (UAI) to a network entity, in response to detecting the one or more conditions, to request a reconfiguration of the UE to operate according to a set of one or more parameters selected based on a value of the at least one metric, wherein the selection comprises:
  - selecting a first set of parameters, in response to detecting the battery level has fallen below a second threshold, wherein the first set of parameters represent a reduction in bandwidth relative to a current configuration; and
  - selecting a second set of parameters, in response to detecting the battery level has fallen below a first threshold, wherein the second set of parameters represent a reduction in bandwidth relative to the first set of parameters.

26. A non-transitory computer readable medium storing computer executable code thereon for wireless communications, comprising code that when executed by one or more processors, performs a method, comprising:
- detecting one or more conditions associated with at least one metric related to user equipment (UE) power consumption, wherein the at least one metric comprises a battery level of the UE; and
- transmitting UE assistance information (UAI) to a network entity, in response to the detection, to request a reconfiguration of the UE to operate according to a set of one or more parameters selected based on a value of the at least one metric, wherein the selection comprises:
  - selecting a first set of parameters, in response to detecting the battery level has fallen below a second threshold, wherein the first set of parameters represent a reduction in bandwidth relative to a current configuration, and
  - selecting a second set of parameters, in response to detecting the battery level has fallen below a first threshold, wherein the second set of parameters represent a reduction in bandwidth relative to the first set of parameters.

* * * * *